Nov. 3, 1953     H. D. CRANDON     2,657,391
HAND COVERING
Filed Nov. 24, 1948

*INVENTOR.*
HARRY D. CRANDON
BY
*Louis L. Gagnon*
ATTORNEY

Patented Nov. 3, 1953

2,657,391

UNITED STATES PATENT OFFICE 2,657,391

HAND COVERING

Harry D. Crandon, Woodstock, Conn., assignor to American Optical Company, Southbridge, Mass., a voluntary association of Massachusetts Application November 24, 1948, Serial No. 61,775

6 Claims. (Cl. 2—161)

This invention relates to improvement in hand coverings and has particular reference to the means and method of using thermoplastic material for reinforcing surface portions of hand coverings.

It is a principal object of this invention to provide hand coverings such as gloves, mittens, or the like having a surface portion thereof provided with a protective reinforcing layer of thermoplastic material.

Another object is to provide novel means and methods of applying to portions of the surface of hand coverings layers of protective reinforcing material in the nature of screening or mesh formed of thermoplastic material or of a combination of thermoplastic material and metal.

Another object is to provide novel means and method of simply and economically applying protective reinforcing layers of thermoplastic material to portions of the surfaces of hand coverings.

Other objects and advantages of the present invention will become apparent from the following description read in conjunction with the accompanying drawing, in which.

It is a well known fact that some materials necessarily used in the manufacture of hand coverings are, due to the nature of their construction or composition, quickly and easily worn. This is especially true of asbestos which is easily frayed by cutting or burning of the cotton supporting threads therein, thus requiring early repairing or replacement of hand coverings made of this material. Other materials as well, however, due to the particular nature of their usage are easily worn, cut, burned or otherwise damaged.

Therefore, to overcome many of these difficulties, the present invention provides means and method of manufacturing hand coverings by applying a protective reinforcing layer to the surfaces of the hand covering, or to the portions of the surfaces subjected to the most abuse. This is accomplished by bonding the reinforcing layer to the material from which the hand coverings are to be made prior to blanking out the coverings, or, if desired, portions only of the hand coverings may have the reinforcing layer applied thereon even after final fabrication of the coverings.

Figure 1:
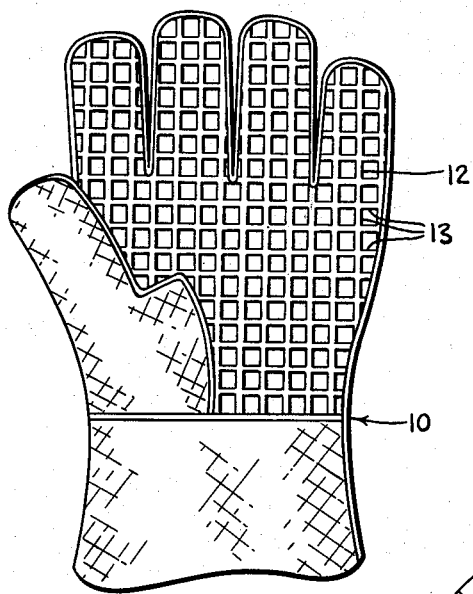
Fig. 1 is a front elevational view of the palm portion of a hand covering embodying the invention.

Referring more particularly to the drawing wherein like characters of reference designate like parts throughout the several views, the invention may be applied to a portion of a hand covering such as the glove 10 illustrated in Fig. 1, or to the material from which the glove was fabricated. The glove 10 may be made of suitable porous material such as cotton, asbestos, leather or the like and may be fabricated from a single type of material or a combination of materials.

Figure 2:
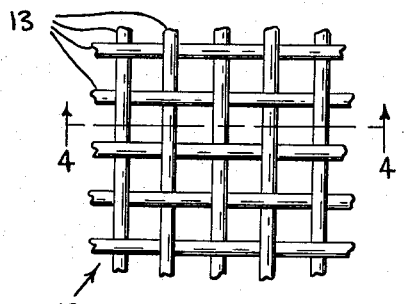
Fig. 2 is a fragmentary front elevation of a reinforcing mesh therefor.
Figure 3:
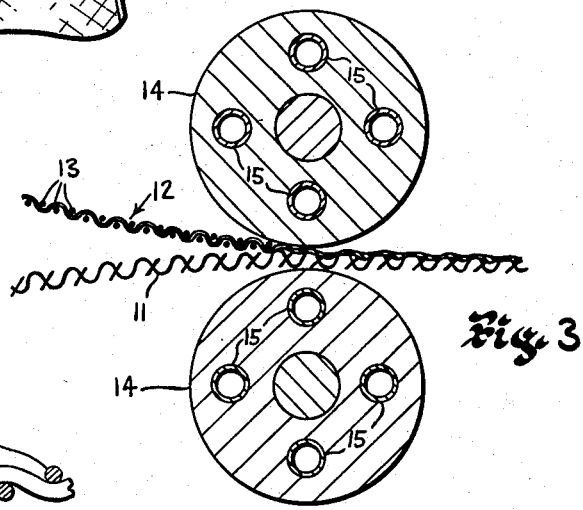
Fig. 3 is a fragmentary sectional view illustrating a method of applying a layer of reinforcing material to the surface of sheet material from which hand coverings may be made.

In reinforcing a sheet of asbestos or other material from which a glove 10 or a portion thereof is to be made, the sheet 11 of said material (Fig. 3) will have deposited on the surface thereof to be reinforced a layer of reinforcing material 12. The reinforcing material 12 may be formed of solid or perforated sheets of filmlike thermoplastic material of a heat softenable nature or preferably, as shown in Fig. 2, in the nature of screening or mesh made of a multiplicity of woven strands 13 of the thermoplastic material. It is preferred that the sheet 12 of thermoplastic material be made with perforations or as a mesh since after being applied to a hand covering this would tend to permit ventilation and would not materially reduce porosity, heat resistance, or flexibility. The strands 13 of the screen 12 to serve as a bonding material as well as a reinforcement must be made of a heat softenable thermoplastic material such as polyvinyl butyral, polyvinyl chloride acetate or other synthetic resin.

After placing a sheet 12 of thermoplastic material upon the surface of the sheet 11 to be reinforced, the sheet 12 and sheet 11 may be subjected to heat and pressure to cause the sheet to become softened preferably to such a low viscosity that it reaches a flowable state. This can be accomplished in various manners by the use of simple and inexpensive means such as by running the sheet 11 with the thermoplastic sheet 12 thereon between a pair of pressure rollers 14. The rollers 14 may be suitably heated as by heating elements 15 associated therewith and adapted to be rotated by any suitable mechanical or other well known means so that upon rotation thereof the material 11 and sheet 12 will be subjected to heat and pressure, whereupon the sheet 12 will become softened and will embed in the porous material 11, saturating it to such an extent that upon removal of the heat and pressure and being allowed to cool the thermoplastic material of which the sheet 12 was formed will again reach a state of relatively high viscosity, thus forming a protective foraminous thermoplastic covering embedded in the surface of the material 11.

Following this procedure, the portions of the glove 12 or other hand covering to be made from this reinforced material may be blanked or otherwise cut from the material.

When hand coverings such as the glove 10 are subjected to extremely rough usage as by handling sharp edged objects it may be desired to reinforce the surface thereof with a material which is even more durable than the thermoplastic material. This can be done by providing the screen 12 with metal strands interwoven with strands of thermoplastic material, the strands of metal being of small enough diameter to permit flexibility. The combined metal and plastic screening (Figs. 4 and 5) can be applied to the surface of the material from which the hand covering is to be made in the same manner as the sheet 12 of thermoplastic material, the strands of thermoplastic material upon application of heat and pressure being adapted to embed in the material and upon cooling forming a mechanical bond between the metal strands and the material.

Figure 4:
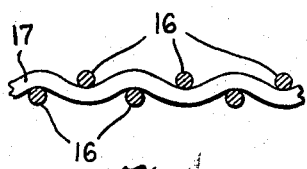
Fig. 4 is a fragmentary sectional view taken on line 4—4 of Fig. 2 showing a section of the mesh before application to a hand covering.
Figure 5:
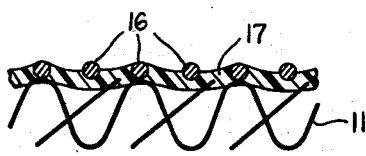
Fig. 5 is a fragmentary sectional view of the mesh shown in Fig. 4 after application to a porous material.

This feature is clearly illustrated in Fig. 4 wherein longitudinally extending strands 16 of metal are interwoven with strands 17 of thermoplastic material. Upon application of heat and pressure the strands 17 will become softened and will embed in the adjacent portions of the glove material 11 (Fig. 5) and the metal strands 16 will be pressed down into the softened thermoplastic material and into surface abutment with the glove material. Upon cooling, the thermoplastic material will again harden to form an integral mechanical bond between the glove material 11 and metal strands 16.

In this manner gloves or the like can be made to withstand considerable abuse by sharp objects, the metal strands acting to prevent the glove from becoming cut or torn thereby. Although the metal strands may somewhat reduce the flexibility of the glove, the strands can be made of small enough diameter so that this feature becomes of negligible importance.

It is to be understood, however, that the thermoplastic material may be of a liquid or doughy form and may be applied as a coating of polyvinyl butyral emulsion, synthetic rubber emulsion, or flexible polyesterstyrene copolymer and may be applied as by brushing or otherwise providing a layer thereof on the surface to be reinforced. One method by which the thermoplastic material may be applied is by a mechanical striping process wherein the material to be coated may be moved into such a position that thermoplastic material in liquid form may flow from a suitable source onto the moving material. In this manner entire rolls or other large supplies of glove material may be provided with the thermoplastic material in longitudinal and/or horizontal stripes.

It is also to be understood that such a thermoplastic or thermoplastic-metal reinforcement may be applied, if desired, merely to small portions of a hand covering after the hand covering has been fabricated, and the heat and pressure applied by any suitable available means so that the surface being reinforced may become impregnated substantially as described.

Hand coverings made in the manner herein described are exceptionally durable and the lives thereof considerably prolonged, especially in the case of asbestos gloves subject to burning or charring, and other glove materials subjected to considerable abuse.

From the foregoing it will be seen that no complicated machinery is necessary to efficiently perform the functions described and the complete operation can be performed simply and economically.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. A hand covering comprising a base portion of flexible porous sheet material shaped to fit about a wearer's hand and having a plurality of strands of a relatively limp synthetic resinous material arranged on a surface thereof in crisscross relation and embedded in said surface of the sheet material so as to be interlocked therewith, said strands forming a protective reinforcement for said base portion that does not substantially interfere with the inherent flexibility of the sheet material.

2. A hand covering comprising a base portion of flexible asbestos material shaped to fit about a wearer's hand and having a loosely woven network of strands of a relatively limp polyvinyl resin arranged on a surface thereof and embedded in said surface of the asbestos so as to be interlocked therewith, said strands forming a protective reinforcement for said asbestos that does not substantially interfere with the inherent flexibility thereof.

3. A hand covering comprising a base portion of flexible porous sheet material shaped to fit about a wearer's hand and having on a surface thereof a plurality of strands of a relatively flexible synthetic resin woven with strands of metallic material, said metallic strands being of sufficiently small diameter as to be freely flexible, and the strands of synthetic resin being embedded in said surface of the sheet material so as to interlock the metallic strands therewith whereby said woven strands form a protective reinforcement for said base portion without substantially interfering with its inherent flexibilty.

4. An article of the character described comprising a base portion of flexible porous asbestos sheeting having a network of loosely interwoven strands of relatively limp synthetic resinous material arranged on a surface thereof and embedded in said surface so as to be interlocked therewith, said strands forming a protective reinforcement for said base portion that does not substantially interfere with the inherent flexibility of the asbestos sheeting.

5. An article of the character described comprising a base portion of flexible porous material having a plurality of strands of metal and a plurality of strands of relatively limp thermoplastic material arranged on a surface thereof in crisscross spaced relation, said metal strands being of sufficiently small diameter as to be relatively freely flexible, and the strands of thermoplastic material being embedded in the surface of the sheet material so as to interlock the metal strands therewith, said strands forming a protective reinforcement for said base portion that does not substantially interfere with the inherent flexibility and porosity of the sheeting.

6. An article having reinforced portions thereof of a porous flexible nature, said portions being formed of flexible porous sheet material having on the outer surface thereof strands of relatively limp thermo-plastic material arranged in spaced crisscross relation with each other and embedded in said surface of the sheet material so as to be interlocked therewith, said strands forming an outer protective reinforcement for said portions that does not substantially interfere with the inherent desired flexibility and porosity thereof.

HARRY D. CRANDON.

References Cited in the file of this patent

UNITED STATES PATENTS

| Number | Name | Date |
|---|---|---|
| 292,037 | Nagel | Jan. 15, 1884 |
| 1,730,763 | Gerding | Oct. 8, 1929 |
| 1,968,409 | Liebowitz | July 31, 1934 |
| 1,968,410 | Liebowitz | July 31, 1934 |
| 2,039,505 | Vollmer | May 5, 1936 |
| 2,058,221 | Ferguson | Oct. 20, 1936 |
| 2,310,889 | Becker | Feb. 9, 1943 |
| 2,401,314 | Quinn | June 4, 1946 |
| 2,473,528 | Hoover | June 21, 1949 |
| 2,474,273 | Olson | June 28, 1949 |
| 2,483,404 | Francis | Oct. 4, 1949 |
| 2,539,690 | Boorn | Jan. 30, 1951 |